Feb. 14, 1950 R. D. AMSDEN 2,497,649

PROCESS OF ELECTROFORMING SELENIUM RECTIFIERS

Filed July 31, 1946

Inventor:
Ralph D. Amsden,
by Harry E. Dunham
His Attorney.

Patented Feb. 14, 1950 2,497,649

UNITED STATES PATENT OFFICE 2,497,649

PROCESS OF ELECTROFORMING SELENIUM RECTIFIERS

Ralph D. Amsden, Lynn, Mass., assignor to General Electric Company, a corporation of New York Application July 31, 1946, Serial No. 687,480

7 Claims. (Cl. 175—366)

The present invention relates to the manufacture of selenium rectifiers. Its object is to improve the characteristics of such rectifiers and in particular to improve their rectification stability during extended non-operative periods.

Selenium rectifiers commonly comprise one or more groups of individual units known as "cells." Selenium cells individually comprise a film of selenium which is held sandwichwise between opposing bodies of metals which function as electrodes, whereby alternating current to be rectified is applied. The selenium film which is deposited on a metal base electrode, prior to the application of the second or counter-electrode, is given appropriate chemical treatment whereby the unilateral conductivity or current-blocking characteristics of the selenium layer is further developed. Upon the application on the treated selenium layer of the counter electrode, which usually is applied by the spray-deposition of metal, the assembled rectifier cell is subjected to a so-called "forming" treatment which is carried out by conducting electric current through the cell. The unsymmetrical conductivity of the cell whereby the flow of current of one polarity is "blocked" up to a breakdown voltage is improved as a result of such "forming," mainly by eliminating defects in the cell. My invention comprises an improved forming process.

Heretofore forming of selenium cells has been carried out by the application of an ordinary alternating current or by a distorted alternating current, this current in either case having a voltage which in the blocking direction exceeded only by a moderate value the blocking voltage of the cell being formed. It was desired only that the voltage should be sufficiently high to burn out minute short-circuited or imperfect areas in the selenium film. During the application of the forming current the rectifier cells heretofore have been maintained at ordinary room temperature (which may be assumed to be 25° C.), disregarding the heat developed by the passage of current. In some instances cooling of the cells has been practiced during forming. In accordance with one of the features of my invention the rectifier cells as a whole are maintained heated above room temperature during forming independently of whatever incidental heating may be effected by the burning out of defective spots by the forming current.

In accordance with another feature of my invention a forming voltage is employed which is about ten times greater than the critical blocking voltage of the rectifier cells being subjected to the forming treatment. The current value transmitted is limited to values insufficient to result in damage to the rectifying unit. The improved rectifier characteristics resulting from these new process steps will be described hereinafter.

Figures 1, 2, 2A:
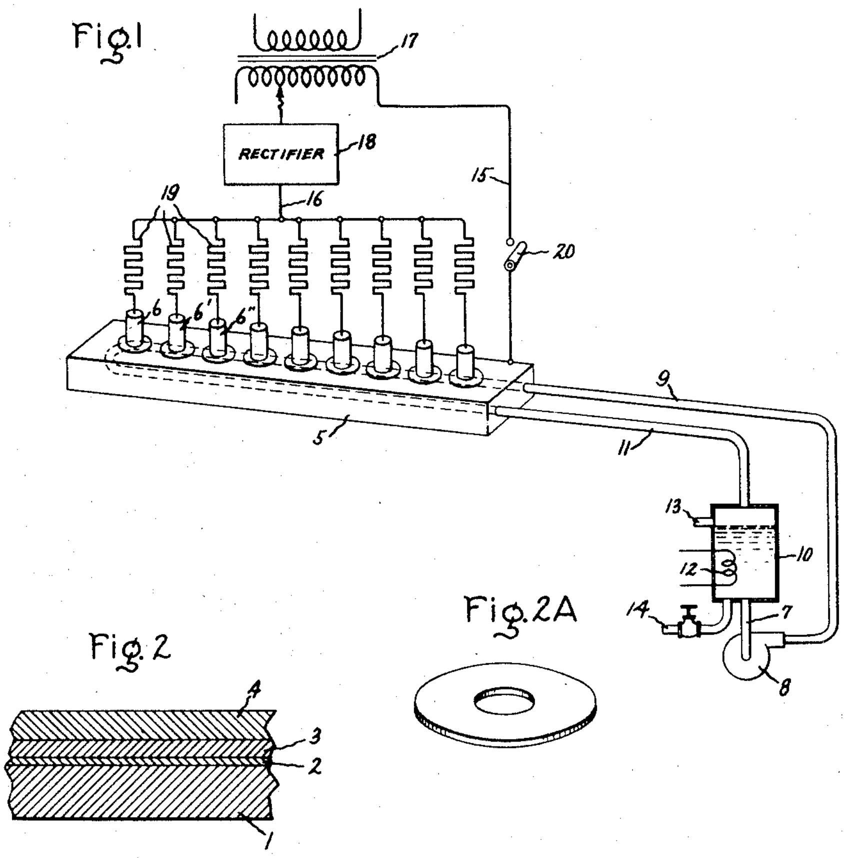
Figure 4:
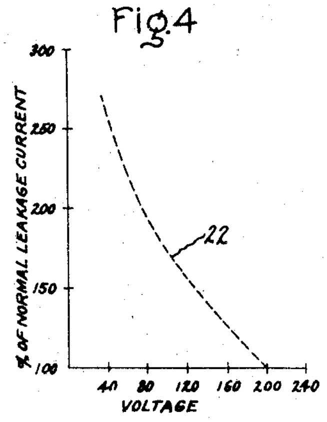
Figure 3:
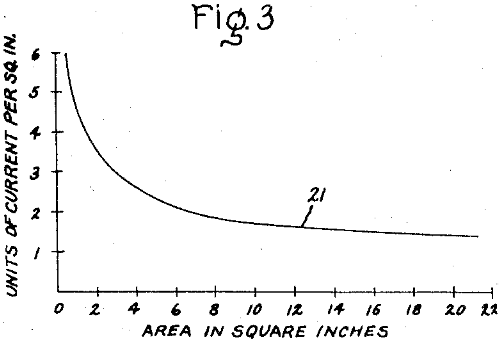

The accompanying drawing shows an apparatus suitable for carrying out my invention. Fig. 1 shows conventionally and in side elevation the forming apparatus, one terminal of which is maintained at a predetermined temperature and also shows diagrammatically an electric system for carrying out the forming process; Fig. 2 is a cross-sectional view somewhat enlarged of a selenium cell structure; Fig. 2A is a perspective view of a cell; Fig. 3 is a graph showing the forming currents in relation to the rectifying area of the selenium cells which are being formed and Fig. 4 is a graph showing leakage currents corresponding to different forming voltages.

The selenium rectifier cell as shown enlarged in Fig. 2 is of typical construction, although specific construction is not a feature of my invention. The cell consists of a base electrode 1, ordinarily consisting of aluminum or steel on which may be deposited successively a very thin film 2 of bismuth, tin or antimony (exaggerated in the drawing) and a layer 3 of selenium. The selenium layer 3 is commonly treated with hydrogen peroxide solution to develop rectifying characteristics. Upon the selenium a counter electrode 4 is applied, ordinarily by spray deposition of an alloy of bismuth cadmium and tin. The fabrication of such a rectifier cell is described in Hewlett Patent 2,334,554, patented November 16, 1943. The ends of the enlarged section of Fig. 2 have been shown broken away to indicate that the area of such a unit may vary widely. One form of selenium cell is shown in Fig. 2A.

In carrying out my present invention selenium cells when ready to be formed, are placed upon a temperature-controlled electric base terminal 5 and cooperating terminals 6, 6', 6'' and so on, are applied to the respective cells as shown in Fig. 1. The base terminal 5 as shown in the drawing is maintained at a desired temperature by the circulation of a suitable heat-interchange medium, water being a satisfactory one. The heat-interchange medium is supplied by a pipe 7 to a pump 8 and from its outlet to a pipe 9 leading to the terminal 5, the return flow to a heated tank 10 occurring through a pipe 11.

A heater 12 in the tank 10 maintains the heat exchange liquid therein at a predetermined temperature which commonly is chosen to be in the range of about 50 to 100° C. A temperature of 80° C. is suitable for most purposes although it is not critical. A thermostat (not shown) may be provided for the heater to control the temperature of the water or other liquid. The liquid may be supplied to the tank 10 through an inlet duct 13 and when desired the tank may be drained by a valved outlet duct 14.

The required electric energy is supplied, as shown by electric conductors 15, 16 which are connected to the secondary of a transformer 17 in series with a rectifier 18. Suitable impedance devices, as for example, resistors 19 are included in series with each of the terminal electrodes 6, 6' 8'' and so on, whereby the forming current is controlled.

With the terminal 5 heated to the chosen temperature, which as stated may be approximately 80° C., a rectified half wave electric current is sent through the selenium cell by closing a switch 20 in the primary circuit of the transformer. The crest voltage of the half waves of current are chosen to be in the range of about 110 to 220 volts, and preferably is chosen to be approximately 200 volts, the R. M. S. voltage being about 150. The resistors 19 have values sufficiently high to limit the current to an average value insufficient to produce damage, for example, to about .1 to .6 ampere per square inch. The value of current chosen is determined by the area of the cells being formed.

The forming current should be chosen as shown in Fig. 3, to correspond inversely with the area of the electrodes being formed. As indicated by the graph 21, there is no direct proportionality between the forming current and the area of the cells, the graph not being a straight line. In general smaller cells may be formed at higher current densities than large cells. For example, a forming current as high as about .6 of an ampere may be used for the smaller cells, which have an area of only about one square inch. Cells having an area of approximately eight square inches and upward, requires a forming current of only about 0.2 ampere per square inch. During the passage of the forming current the temperature of the base electrode is substantially assumed by the selenium rectifier cells which are being treated. Ordinarily the temperature of the selenium cells is raised by the hot base electrode but in some cases the heat generated by the current required to burn out bad spots in the rectifying film is great enough to tend to overheat the selenium cells. In such case heat may be carried away from the cells by the heat-interchange medium flowing through the duct 9 in the base electrode. In other words, the temperature of the cells being treated is kept within predetermined desired limits during the forming process. The application of current is continued for about 10 minutes to three hours, the length of time depending on the specific character and size of the rectifier cells. The larger cells require the longer forming time. For small cells a forming period of thirty minutes usually is adequate.

As a consequence of my invention, selenium rectifier cells are rendered more stable during idle periods than rectifier cells which have been formed by methods heretofore used. Selenium rectifiers when not in use, either when mounted alone or in groups in rectifying apparatus which is temporarily out of service, or when kept in storage in the course of manufacture after having been completed and before being put into use in rectifying apparatus, will pass a substantial leakage current when voltage first is applied in blocking direction. This phenomenon is referred to as the "unforming" of the cells. Ordinarily little harm is occasioned by the unforming if care is exercised to restore the blocking characteristics either by passing current through the rectifier for short intervals until the cell has been reformed, or by reforming the cells as was done originally. However, this tendency for selenium rectifier cells to lose to some extent their rectifying characteristic as evidenced by leakage current, is a disadvantageous property and may cause damage when not appreciated. An ideal rectifier should be ready for service at all times to rectify current of rated voltage without requiring any initial forming treatment with current to restore the rectifying characteristic.

When the forming treatment is carried out in accordance with my invention, the unavoidable leakage current is reduced as shown by graph 22 of Fig. 4. This graph shows in vertical coordinate relative leakage current and on the horizontal coordinate, voltages which were employed during the original forming of the rectifier. As indicated on the base line, different voltages ranging from about 40 to 240 volts were employed during forming. The leakage currents obtained, when thus forming a series of rectifier cells at different voltages, after an assumed extended idle period are plotted vertically. Assuming a normal leakage current in the cell immediately after forming as a basis of comparison, and referring to such current as "100% leakage current," then, as shown by graph 22, when the original forming voltage was 40 volts or less, the leakage current after a given idle period is several fold greater than initially. When the peak forming voltage is progressively raised the increase of the leakage current during the assumed idle period is correspondingly reduced until in the case of cells formed with peak voltage as high as 200 volts or higher the leakage current remains unchanged at the unavoidable minimum value which the cell passes immediately after forming and does not seriously affect the operation of selenium rectifiers. As a consequence of my invention the stability of selenium rectifiers is so materially improved that the leakage current problem is substantially completely overcome.

What I claim as new and desire to secure by Letters Patent of the United States is:

1. The method of improving the rectifying characteristics of a selenium rectifier cell which consists in conducting therethrough electric pulsations having a polarity opposing the blocking characteristic of said cell and during said treatment maintaining said cell at approximately 80° C. independently of the heat developed by said pulsations.

2. The method of treating a selenium rectifier cell which consists in heating said cell to an elevated temperature in the range of about 60 to 100° C., maintaining said temperature substantially constant, and while so heated subjecting said cell to pulsations of forming current having crest potentials in the range of about 110 to 240 volts.

3. The method of treating a selenium rectifier cell which consists in heating said cell to an elevated temperature in the range of about 80° C., maintaining said temperature substantially constant, and while so heated subjecting said cell to pulsations of forming current having crest potentials of about 200 volts.

4. The method of improving the characteristics of a selenium rectifier unit which consists in heating said unit to a temperature of about 60 to 100° C. conducting through said unit for a period of time of about 30 minutes spaced pulsations of unidirectional waves of current, the applied voltage being in the blocking direction and rising to a crest potential of about 200 volts and controlling the current value transmitted through said unit to burn out defects without damaging the rectifying characteristics of said cells.

5. The method of improving the rectifying characteristics of a selenium rectifier cell which consists in heating said cell to a temperature in the range of about 80° C., conducting through said cell for a period of time in the range of about 30 to 180 minutes pulsations of current, having a maximum voltage in the blocking direction of about 110 to 220 volts and limiting the current value transmitted through said cell to a maximum value of about 100 to 600 milliamperes, the current value being chosen in inverse relation to the rectifying area of said cell to remove defects without permanent damage.

6. The method of electrically forming a selenium rectifier cell which comprises, maintaining said cell at a substantially constant temperature in the range of about 60° to 100° C. while applying thereto an alternating potential having a crest intensity in the order of five to ten times the critical blocking voltage of said cell in the reverse direction.

7. The method of electrically forming a selenium rectifier cell which comprises, maintaining said cell at a substantially constant temperature in the range of 60° to 100° C., simultaneously applying thereto an alternating potential having a crest intensity of the order of five to ten times the critical blocking voltage of said cell in the reverse direction, and limiting the total current through said cell in the reverse direction to a value substantially equal to that produced by the direct application of a reverse potential only slightly greater than said critical blocking voltage.

RALPH D. AMSDEN.

REFERENCES CITED

The following references are of record in the file of this patent:

UNITED STATES PATENTS

| Number | Name | Date |
|---|---|---|
| 2,193,610 | Wilson | Mar. 12, 1940 |
| 2,237,802 | Wittke | Apr. 8, 1941 |
| 2,246,161 | Adenstedt | June 17, 1941 |
| 2,261,725 | Hoppe | Nov. 4, 1941 |
| 2,362,545 | Ellis et al. | Nov. 14, 1944 |
| 2,395,295 | Ellis et al. | Feb. 19, 1946 |

Certificate of Correction

Patent No. 2,497,649

February 14, 1950

RALPH D. AMSDEN

It is hereby certified that errors appear in the printed specification of the above numbered patent requiring correction as follows:

Column 2, line 55, for "about 50" read *about 60*; column 3, line 43, for the word "requires" read *require*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*